US006950497B2

(12) United States Patent
Drury et al.

(10) Patent No.: US 6,950,497 B2
(45) Date of Patent: Sep. 27, 2005

(54) FAULT LOCATION IN A TELECOMMUNICATIONS NETWORK

(75) Inventors: Ian R Drury, Blackwood (GB); Charles D O'Connor, Swindon (GB); Andrew D Chattell, Ipswich (GB); Hilary P Logan, Ipswich (GB); Neil A Thorpe, Abberton (GB); Geoffrey R Lowndes, Werrington (GB); Nicholas Lunt, Ipswich (GB)

(73) Assignee: British Telecommunications public limited company, London (GB)

( * ) Notice: Subject to any disclaimer, the term of this patent is extended or adjusted under 35 U.S.C. 154(b) by 260 days.

(21) Appl. No.: 10/221,319

(22) PCT Filed: Mar. 29, 2001

(86) PCT No.: PCT/GB01/01422

§ 371 (c)(1),
(2), (4) Date: Sep. 11, 2002

(87) PCT Pub. No.: WO01/76207

PCT Pub. Date: Oct. 11, 2001

(65) Prior Publication Data
US 2003/0048878 A1 Mar. 13, 2003

(30) Foreign Application Priority Data
Mar. 31, 2000 (EP) .............................. 00302748

(51) Int. Cl.[7] ................. H04M 1/24; H04M 3/08; H04M 3/22
(52) U.S. Cl. ................ 379/14.01; 379/1.01; 379/15.05; 379/16; 379/22.03
(58) Field of Search ............................. 379/1.01, 1.03, 379/1.04, 14, 15.01, 15.04, 15.05, 16, 22, 22.03, 24, 29.01, 29.09, 30, 14.01, 29.1

(56) References Cited

U.S. PATENT DOCUMENTS

| 4,820,991 | A | * | 4/1989 | Clark .......................... 324/519 |
| 5,699,402 | A | * | 12/1997 | Bauer et al. .............. 379/29.09 |
| 5,854,824 | A | * | 12/1998 | Bengal et al. ........... 379/32.04 |
| 6,008,654 | A | * | 12/1999 | Chaskell ..................... 324/519 |
| 6,084,946 | A | * | 7/2000 | Beierle ......................... 379/30 |
| 6,125,458 | A | * | 9/2000 | Devan et al. ................. 714/43 |
| 6,233,312 | B1 | * | 5/2001 | Chaskell ................. 379/22.02 |
| 6,330,305 | B1 | * | 12/2001 | Jones et al. ............. 379/14.01 |
| 6,741,676 | B2 | * | 5/2004 | Rudinsky et al. ........ 379/27.04 |
| 2003/0063712 | A1 | * | 4/2003 | Chattell et al. .......... 379/26.01 |
| 2003/0067881 | A1 | * | 4/2003 | Lunt et al. .................. 370/242 |

FOREIGN PATENT DOCUMENTS

WO    WO 96 19072 A    6/1996

OTHER PUBLICATIONS

Quarmby, "GIS: Mapping the TWN Model", Telecommunications (International Edition), vol. 32, No. 2, Feb. 1998, pp. 70–73, XP002144967.

* cited by examiner

Primary Examiner—Quoc Tran
(74) Attorney, Agent, or Firm—Nixon & Vanderhye P.C.

(57) ABSTRACT

A fault is located along a telecommunications line between the network terminating equipment and the local exchange by measuring a change in the capacitance of the line when compared with the capacitance under normal operating conditions. A geographical information system is used to plot all possible routes for the line between the terminating equipment and the exchange, and the most probable route is selected based on the known positions of nodes along the line, such as pole mounted distribution points and streetside cabinets. The distance of the fault along the line is then plotted along the most probable route to determine an accurate fault location, which is given to a field technician as the location of the nearest premises or a grid reference.

14 Claims, 4 Drawing Sheets

FAULT LOCATION IN A TELECOMMUNICATIONS NETWORK

This application is the US national phase of international application PCT/GB01/01422 filed 29 Mar. 2001 which designated the U.S.

BACKGROUND OF THE INVENTION

1. Field of the Invention

This invention relates to the field of fault location in a telecommunications network.

2. Related Art

A conventional public telecommunications network is generally described as having two parts, namely a core network and an access network. The access network is that part of the network which extends from the terminal equipment, for example a customer's telephone or a public call box, to a local exchange. The core network includes the local and trunk exchanges.

In a conventional access network, each communications line is formed from a pair of copper wires. Typically, each pair of wires pass through a series of nodes between the local exchange and the terminal equipment. Examples of such nodes are primary cross-connect points, secondary cross-connect points, distribution points and joints.

Recently, optical fibres have been used to replace copper wires in access networks. In a modern access network, both copper wires and optical fibres are used. Where a communications line consists of an optical fibre, the line will typically pass through several nodes between the local exchange and the terminal equipment. At each node, the incoming fibre from the local exchange is split into a group of outgoing fibres which branch out in various directions. The last part of the circuit to the terminal equipment may still be carried by a pair of copper wires.

Since the components of the access network are those which are most exposed to the elements, this part of the public telecommunications network is particularly prone to faults. In a conventional access network, examples of such faults are disconnection faults, where the communications line is interrupted between the local exchange and the terminal equipment, short circuit faults, for example a short circuit between the two wires of a pair of wires and earthing faults, for example a short circuit between one of the wires and earth. The causes of the faults include physical damage to a node as well as leakage of water into a node.

To enable a network provider to remedy faults rapidly, local exchanges are provided with line testing apparatus which may be used to test each line. Such tests can be used to determine the approximate location of the fault between the local exchange and the terminal equipment.

For example, International Publication No. WO96/19072 discloses a method and apparatus for testing telecommunications lines by measuring the line capacitance. A capacitance measuring device at a local exchange periodically tests the capacitance of each wire pair. A capacitance value is stored for each wire pair, denoting the normal operational state of the line. If, during a subsequent measurement, the capacitance changes to an extent which indicates a fault on the line, the value of the capacitance change is determined, from which an approximate distance to the fault is calculated, based on a known capacitance/length ratio for the line. This calculation indicates the distance of the fault from the subscriber's terminal equipment.

The above described system indicates the distance of a fault along a length of line. However, it does not indicate the physical location of a fault, since the line between the terminal equipment and the local exchange follows the pattern of the streets in the area. Therefore, the physical location of the fault can only be determined by having an accurate map of the path followed by the line, which may extend for many kilometres, and measuring the indicated fault distance along this map.

BRIEF SUMMARY OF THE INVENTION

To address the above problem, there is provided according to an exemplary embodiment of the present invention a method of determining the location of a fault on a line in a telecommunications network which runs between first and second nodes, the line being connected to at least one further node along its length, comprising determining a plurality of possible routes for the line in dependence on the length of the line and the positions of the first and second nodes, selecting a route from the plurality of possible routes in dependence on the position of the at least one further node in relation to each of the plurality of possible routes, and determining the location of the fault along the selected route according to a length of line between the fault and one of said first and second nodes.

By combining measurement of a fault length with a cable route inference system, a technician can be accurately directed to the location of the fault.

According to the invention, there is further provided a fault location system for determining the location of a fault on a line in a telecommunications network which runs between first and second nodes, the line being connected to at least one further node along its length, comprising means for determining a plurality of possible routes for the line in dependence on the length of the line and the positions of the first and second nodes, means for selecting a route from the plurality of possible routes in dependence on the position of the at least one further node in relation to each of the plurality of possible routes, and means for determining the location of the fault along the selected route in dependence on the length of the line between the fault and one of said first and second nodes.

The means for determining a plurality of possible routes can be a geographical information system mapping the area between the first and second nodes.

BRIEF DESCRIPTION OF THE DRAWINGS

Embodiments of the invention will now be described with reference to the accompanying drawings, in which.

DETAILED DESCRIPTION OF EXEMPLARY EMBODIMENT

Figure 1:
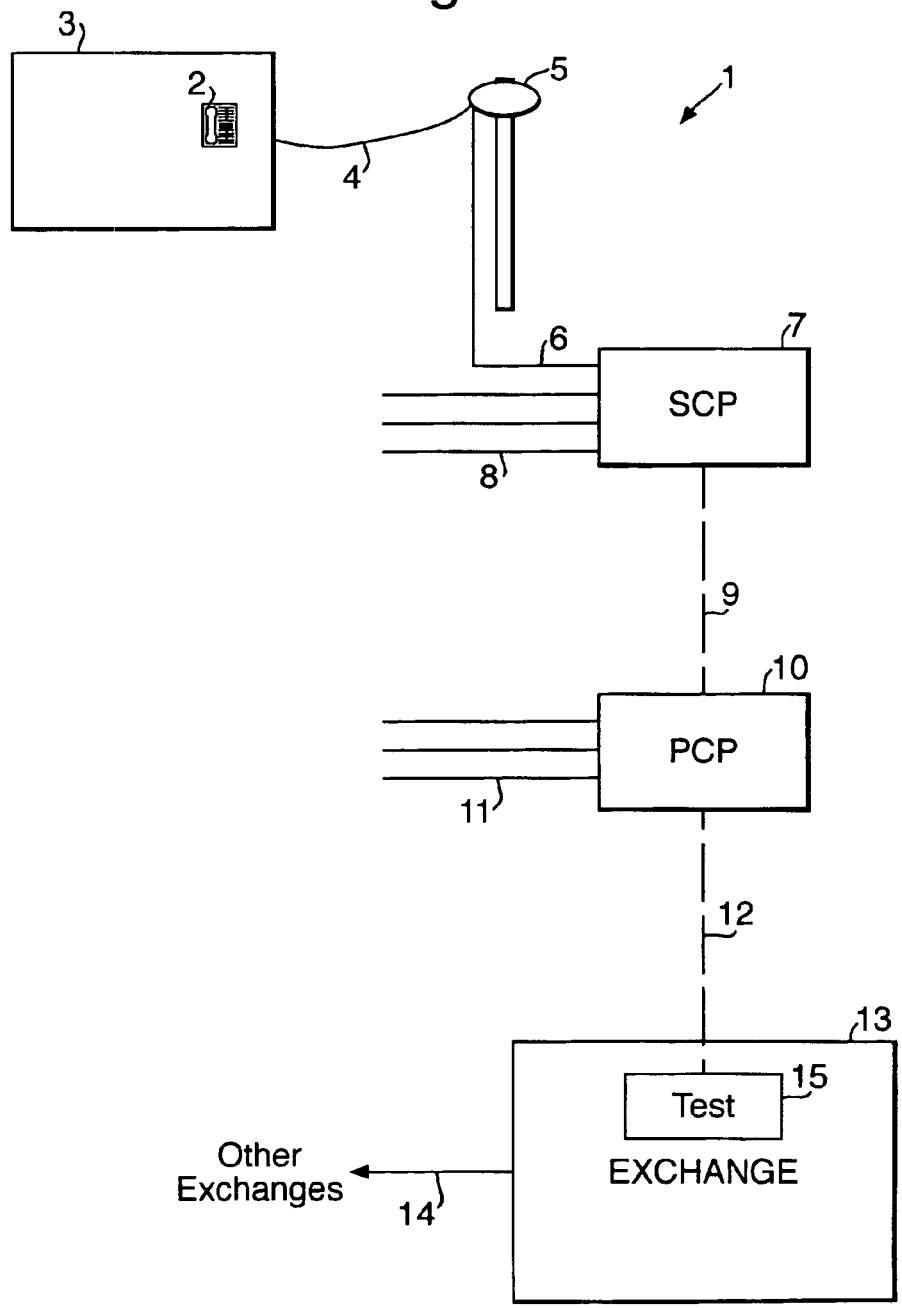
FIG. 1 is a schematic diagram showing the access network part of a public telecommunications network including testing equipment at a local exchange connected to the access network.

Referring to FIG. 1, a telecommunications network 1 includes a customer's terminal equipment 2 located, for example, at a customer's premises 3, a drop wire 4 connected between the customer's equipment and a pole mounted distribution point (DP) 5, a cable 6 extending from the distribution point 5 to a secondary cross-connection point (SCP) 7, further cables generally indicated at 8 extending from other distribution points (not shown) to the secondary cross-connection point 7, a cable 9 extending from the SCP 7 to a primary cross-connection point (PCP) 10, further cables generally indicated at 11 extending from other SCPs (not shown) to the PCP 10, a cable 12 extending from the PCP 10 to a local area exchange 13, a cable 14 linking the local area exchange 13 to other exchanges (not shown), and line test equipment 15 located in the exchange 13. The PCP 10 and the SCP 7 are for example street-side cabinets or underground junction boxes. As mentioned above, the part of the network 1 between the customer's equipment 2 and the local exchange 13 is known as the access network.

The drop wire 4 comprises a pair of copper wires held apart by an insulating sheath. A distribution point 5 usually serves around, for example, 8 houses. The wire pairs continue from the distribution point 5 as part of the cable 6. Thus, the cable 6 includes 8 or more wire pairs plus a further 8 or more spare pairs making a total of typically 20 wire pairs. Similarly, each of the other cables 6 includes, for example, 20 wire pairs. The cable 9 between an SCP 7 and a PCP 10 carries about 80 wire pairs and the cable 12 between the PCP 10 and the exchange 13 about 240 wire pairs.

Figure 2:
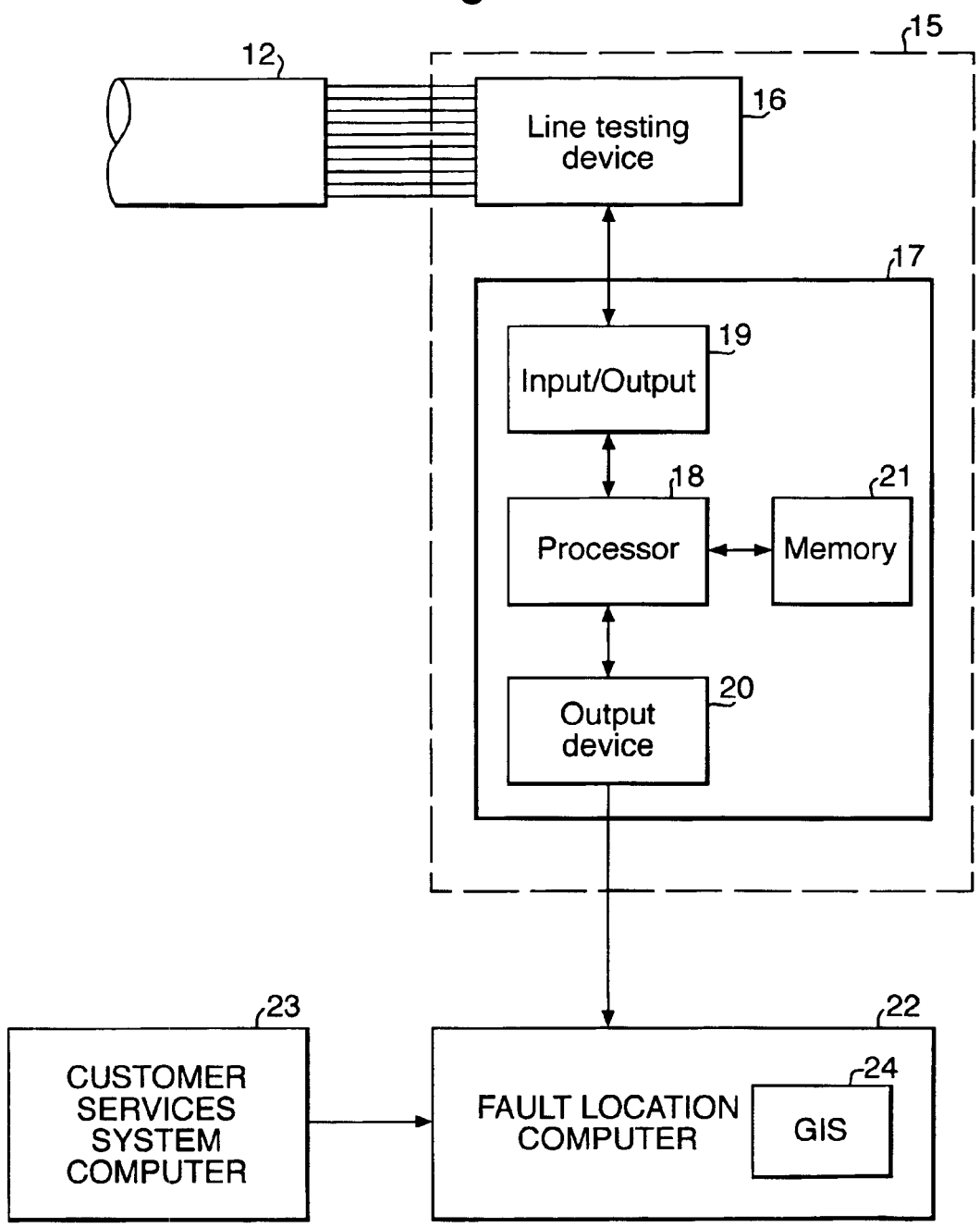
FIG. 2 is a schematic diagram of the testing equipment shown in FIG. 1.

Referring to FIG. 2, the line test equipment 15 used to detect faults on the wire pairs comprises a line testing device 16, for example, a capacitance measuring device, and a computer 17. The line testing equipment 15 can for example comprise the Vanderhof line test system, from Porta Systems Ltd, Coventry, UK or the Teradyne line test system, from Teradyne, Inc. Boston, USA.

The computer 17 includes a processor 18, an input/output interface 19, an output device 20 and memory 21, including for example RAM memory and longer term memory, such as a hard disk drive. The input/output interface 19 is for example an input/output port to which the line testing device 16 passes measured values, for example measured capacitance and through which it receives instructions from the processor 18, such as the line scan rate. The output device 20 is connected to a fault location computer 22 located at a centre remote from the local exchange. The fault location computer also receives information from a customer services system computer 23. The fault location computer 22 includes a geographical information system (GIS) 24 which is a software environment that allows digital map data to be displayed and manipulated. For example, the fault location system can be implemented within the commercially available Mapinfo GIS environment.

A system according to the invention uses a value for the length of line from the customer's terminal equipment to a fault, or from the exchange to the fault, which is obtained using capacitance measurements in a manner which is well known per se, as described for example in International Publication No. WO96/19072. For completeness, a method of determining this length using capacitance measurements is described below with reference to FIG. 3.

Figure 3:
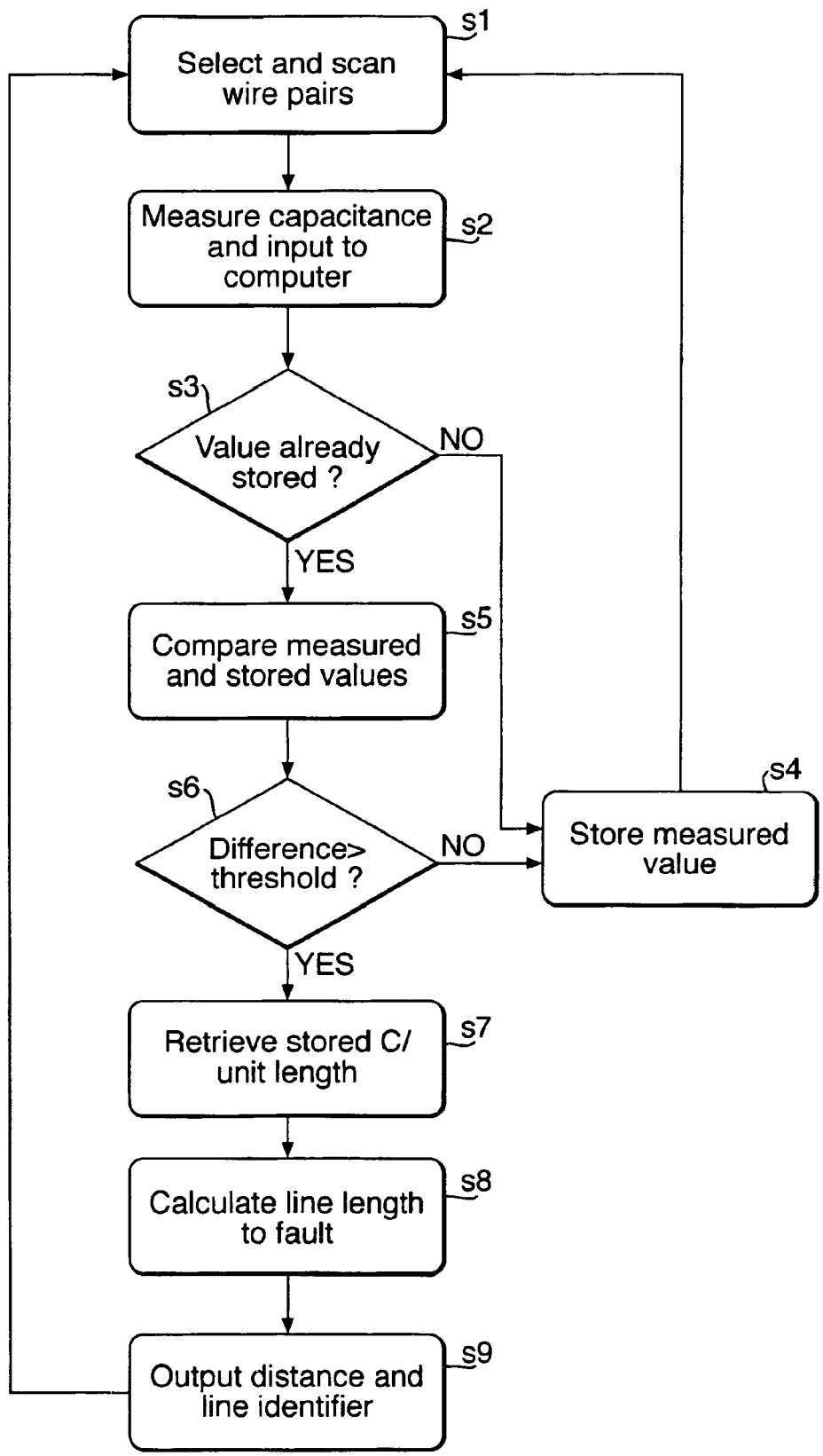
FIG. 3 is a flow diagram illustrating a method of measuring the distance to a fault along a telecommunications line.

Referring to FIG. 3, the processor 18 instructs the line testing device 16 to scan each wire pair in the cable 20 at a predetermined rate, for example, once every night and to measure line capacitance (step s1). The testing device 16 reads the capacitance value for a selected wire pair and sends the result to the processor 18 via the input/output device 19 (step s2). The processor 18 checks the memory 21 to determine whether it has a stored capacitance value for the wire pair available from a previous scan (step s3). If not, the measured value is stored (step s4) and scanning resumed (step s1). If the memory 21 already contains a stored value for the wire pair in question, the processor 18 compares the new value with the stored value (step s5). The processor determines whether the values match to within a predetermined threshold to account for normal operational variations (step s6). If they do, the measured value is stored as the new value (step s4) and monitoring of the next wire pair is resumed (step s1). However, if the difference between measured and stored capacitance values exceeds the predetermined threshold, the processor 18 determines that a fault has occurred, retrieves a stored value of capacitance per unit length for the cable in question (step s7) and calculates the length of line between the exchange 13 and the fault, by dividing the measured capacitance by the known capacitance per unit length (step s8). The output device 20 sends the determined length to the fault location computer 22 together with a line identifier and the nominal length of the line (step s9). The nominal length of the line can be calculated by the processor 18 applying the capacitance/unit length calculation to the stored capacitance value, which represents the length of the line under normal operational conditions. Alternatively or in addition, the output device 20 produces a line length from the customer's terminal equipment to the fault by determining the difference between the stored and measured capacitance values, which represents the length of line between the terminal equipment and the fault, and applying the capacitance per unit length calculation.

Figure 4:
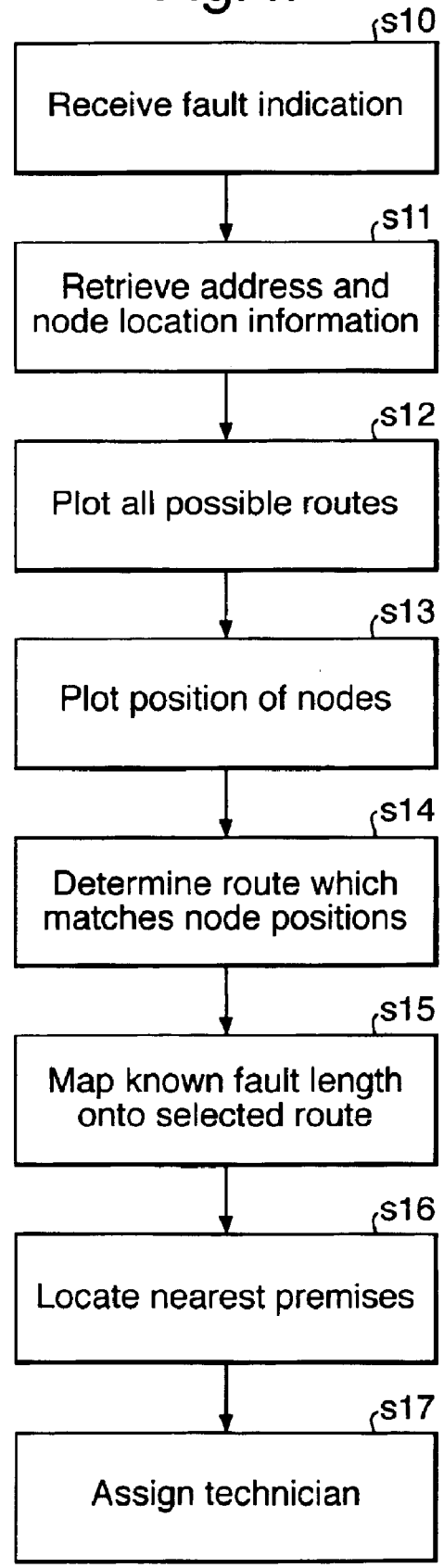
FIG. 4 is a flow diagram illustrating a method of determining the fault location corresponding to a measured distance to a fault.

FIG. 4 describes the operations carried out at the fault location computer 22 on receiving a value for the length of line between the fault and the exchange or the fault and the customer's terminal equipment.

Referring to FIG. 4, the fault location computer 22 receives a fault indication comprising a line identifier and a fault length from the line test system (step s10).

The fault location computer 22 then retrieves the address of the customer and the location of the exchange from the customer services system 23, together with the locations of the various nodes relating to the line (step s11). These nodes are shown in FIG. 1 and include the primary cross-connect points 10, secondary cross-connect points 7 and distribution points 5. The locations of these various nodes are held in the customer services system 23, based on information obtained from engineering drawings. To improve accuracy, the locations of the primary cross connect points 10 are measured using a global positioning system device (GPS). Other techniques can be used to determine location information. For example, in the case of distribution points which are not well marked on engineering drawings, the position is taken to be the centroid of the addresses of the customers' premises served by the distribution point.

The geographical information system 24 covering the area between the exchange and the customer's premises is used to display all possible routes from the exchange to the customer's premises which approximately fit the known total length of the line in question, following the pattern of roads in the area (step s12).

The fault location computer 22 then maps the retrieved node information onto the GIS system display (step s13). The display is examined visually to determine which route most closely matches the positions of the nodes (step s14). The identified line length to the fault is then plotted on the GIS display from the exchange to the fault or from the customer's premises to the fault (step s15). The nearest premises to the fault are located, or a grid reference of the fault is determined (step s16). A field technician is then assigned to correct the fault (step s17).

When the field technician assigned to the fault confirms the actual location, a global positioning system (GPS) device is used to determine the grid reference of the actual fault location, which is subsequently recorded to measure the efficiency of the location process and to confirm the efficiency of the cable route inference algorithm. Once a route has been identified, the information is stored to enable a virtual model of the access network to be built.

In alternative embodiments of the invention, methods other than capacitance measurements are used to calculate the distance to a fault, which can depend on different types of fault that can occur. The invention is therefore not limited to the use of capacitance measurement, but can be used with any method which is capable of determining the length of line between a fault and a known point on the line. For example, line loss and impedance measurement could be used.

What is claimed is:

1. A method of determining the location of a fault on a line in a telecommunications network which runs between first and second nodes, the line being connected to at least one further node along its length, said method comprising:

determining a plurality of possible routes for the line in dependence on the length of the line and the positions of the first and second nodes, selecting a route from the plurality of possible routes in dependence on the position of the at least one further node in relation to each of the plurality of possible routes; and determining the location of the fault along the selected route in dependence on the length of the line between the fault and one of said first and second nodes.

2. A method as in claim 1, further comprising determining the length of the line in dependence on a characteristic of the line.

3. A method as in claim 2, wherein the characteristic comprises the capacitance of the line.

4. A method as in claim 1, wherein the step of determining the plurality of possible routes includes using a geographical information system to map a plurality of routes which terminates at each of the first and second nodes and which have a route length which corresponds to the line length between the first and second nodes.

5. A method as in claim 1, wherein the step of selecting a route includes determining which one of the plurality of routes corresponds to the position of the at least one further node.

6. A method as in claim 1, wherein the step of determining the location of the fault along the selected route comprises calculating the position along the selected route which is the same distance from a given node as the distance of the fault from said given node.

7. A fault location system for determining the location of a fault on a line in a telecommunications network which runs between first and second nodes, the line being connected to at least one further node along its length, said system comprising:

means for determining a plurality of possible routes for the line in dependence on the length of the line and the positions of the first and second nodes, means for selecting a route from the plurality of possible routes in dependence on the position of the at least one further node in relation to each of the plurality of possible routes; and means for determining the location of the fault along the selected route in dependence on the length of the line between the fault and one of said first and second nodes.

8. A system as in claim 7, further comprising means for determining the length of the line.

9. A system as in claim 8, wherein said determining means comprises line testing equipment.

10. A system as in claim 9, wherein the line testing equipment is configured to measure the capacitance of the line.

11. A system as in claim 7, wherein the at least one further node comprises a plurality of nodes including a primary cross-connection point and a secondary cross-connection point.

12. A system as in claim 7, wherein the first and second nodes comprise terminal equipment and a local exchange in a telecommunications network.

13. A system as in claim 7, wherein said means for determining a plurality of possible routes comprises a geographical information system.

14. A storage medium containing a computer program which, when run on a computer, performs a method as in claim 1.

* * * * *